(12) United States Patent
Chen et al.

(10) Patent No.: US 7,149,044 B1
(45) Date of Patent: Dec. 12, 2006

(54) METHODS, APPARATUS AND COMPUTER PROGRAM PRODUCTS FOR WRITING TRACKS ON A DISK BASED ON AN AVAILABLE STROKE

(75) Inventors: Yuan Chen, Cupertino, CA (US); Brian Rigney, Louisville, CO (US); Lin Guo, Saratoga, CA (US); Don Brunnett, Pleasanton, CA (US); Yu Sun, Fremont, CA (US); Stanley H. Shepherd, Morgan Hill, CA (US)

(73) Assignee: Maxtor Corporation, Longmont, CO (US)

( * ) Notice: Subject to any disclaimer, the term of this patent is extended or adjusted under 35 U.S.C. 154(b) by 0 days.

(21) Appl. No.: 10/895,467

(22) Filed: Jul. 20, 2004

Related U.S. Application Data (60) Provisional application No. 60/560,522, filed on Apr. 8, 2004.

(51) Int. Cl.
*G11B 5/09* (2006.01)
(52) U.S. Cl. .................. 360/48; 360/77.02; 360/78.08
(58) Field of Classification Search .................. None
See application file for complete search history.

(56) References Cited

U.S. PATENT DOCUMENTS

| | | | |
|---|---|---|---|
| 6,052,250 A * | 4/2000 | Golowka et al. ........ 360/77.08 |
| 6,091,559 A * | 7/2000 | Emo et al. ..................... 360/48 |
| 6,130,796 A * | 10/2000 | Wiselogel ..................... 360/75 |
| 6,181,504 B1 * | 1/2001 | Ahn ......................... 360/77.04 |
| 6,188,484 B1 * | 2/2001 | Lee et al. .................... 356/499 |
| 6,256,160 B1 * | 7/2001 | Liikanen et al. .............. 360/48 |
| 6,260,257 B1 * | 7/2001 | Emo et al. ................ 29/603.09 |
| 6,437,947 B1 * | 8/2002 | Uno ......................... 360/78.04 |
| 6,452,753 B1 * | 9/2002 | Hiller et al. .............. 360/254.7 |
| 6,480,361 B1 * | 11/2002 | Patterson ................. 360/254.3 |
| 6,493,176 B1 * | 12/2002 | Deng et al. .............. 360/78.05 |
| 6,721,121 B1 * | 4/2004 | Schreck et al. .......... 360/77.02 |
| 6,735,031 B1 * | 5/2004 | Chainer et al. ............. 360/51 |
| 6,765,744 B1 * | 7/2004 | Gomez et al. ................ 360/75 |
| 6,778,343 B1 * | 8/2004 | Nunnelley ................... 360/31 |
| 6,885,514 B1 * | 4/2005 | Codilian et al. ............. 360/31 |
| 2004/0179292 A1 * | 9/2004 | Zayas et al. ............. 360/78.08 |
| 2004/0201914 A1 * | 10/2004 | Ikeda et al. ................... 360/75 |
| 2004/0223436 A1 * | 11/2004 | Tsai ......................... 369/53.22 |
| 2005/0041322 A1 * | 2/2005 | Kagami et al. .......... 360/77.02 |
| 2005/0068657 A1 * | 3/2005 | Yamamoto ................... 360/75 |
| 2005/0122607 A1 * | 6/2005 | Zhu et al. ..................... 360/31 |

\* cited by examiner

*Primary Examiner*—Wayne Young
*Assistant Examiner*—Dismery Mercedes
(74) *Attorney, Agent, or Firm*—Myers Bigel Sibley & Sajovec, PA (57) ABSTRACT

Track pitch for writing tracks on a disk is determined based on an available stroke across the disk. The available stroke is identified by searching across the disk for where information can be written and read. The track pitch is determined for writing tracks on the disk based on the available stroke across the disk. Tracks are written on the disk based on the determined track pitch.

30 Claims, 6 Drawing Sheets

METHODS, APPARATUS AND COMPUTER PROGRAM PRODUCTS FOR WRITING TRACKS ON A DISK BASED ON AN AVAILABLE STROKE

RELATED APPLICATION

This application claims the benefit of and priority to U.S. Provisional Patent Application No. 60/560,522, filed Apr. 8, 2004, the disclosure of which is hereby incorporated herein by reference as if set forth in its entirety.

FIELD OF THE INVENTION

The present invention relates to disk based storage devices and, more particularly, to determining track pitch for information on the disk.

BACKGROUND OF THE INVENTION

A disk drive system is a digital data storage device that stores information within tracks on a storage disk. The storage disk may, for example, include a magnetic, an optical, or a magneto-optical material that is capable of storing data. During operation of the disk drive, the disk is rotated about a central axis. To read data from or write data to the disk, a magnetic transducer is positioned above a desired track of the disk while the disk is spinning.

Figure 1:
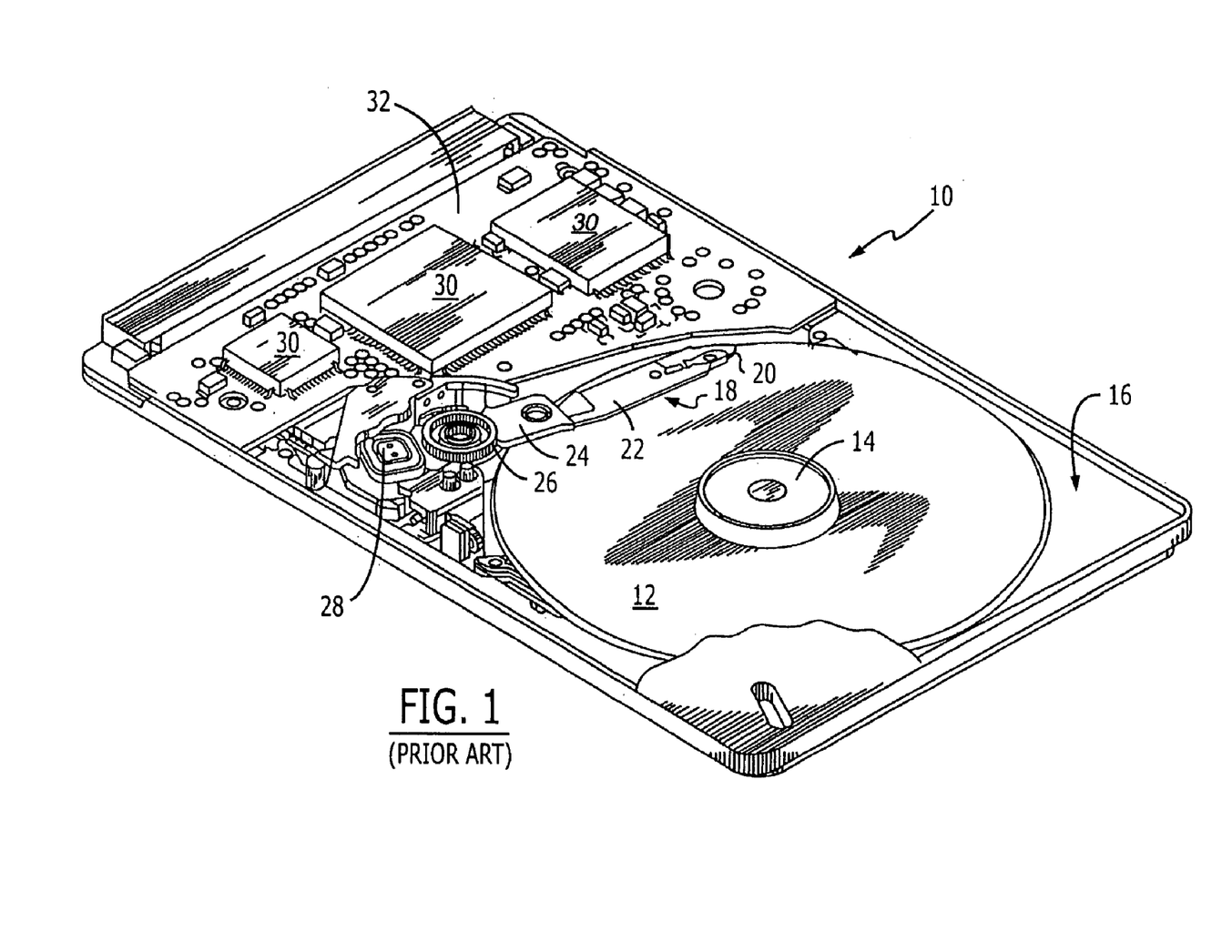
FIG. 1 illustrates a perspective view of a conventional disk drive.

A conventional magnetic disk drive, generally designated 10, is illustrated in FIG. 1. The disk drive comprises a storage disk 12 that is rotated by a spin motor 14. The spin motor 14 is mounted to a base plate 16. An actuator arm assembly 18 is also mounted to the base plate 16.

The actuator arm assembly 18 includes a transducer 20 mounted to an actuator arm 22 that can rotate about a bearing assembly 26. The actuator arm assembly 18 includes a voice coil motor (VCM) 28, which moves the transducer 20 relative to the disk 12. The spin motor 14, VCM 28 and transducer 20 are coupled to a number of electronic circuits 30 mounted to a printed circuit board 32. The electronic circuits 30 typically include one or more read channel chips, a microprocessor-based controller and a random access memory (RAM), among other things.

Instead of having a single disk 12 as shown in FIG. 1, as is well-known in the art, the disk drive 10 may include a plurality of disks 12. In such case, each of the plurality of disks 12 may have two sides, with magnetic material on each of those sides. Therefore, two actuator arm assemblies 18 may be provided for each disk 12.

Figure 2:
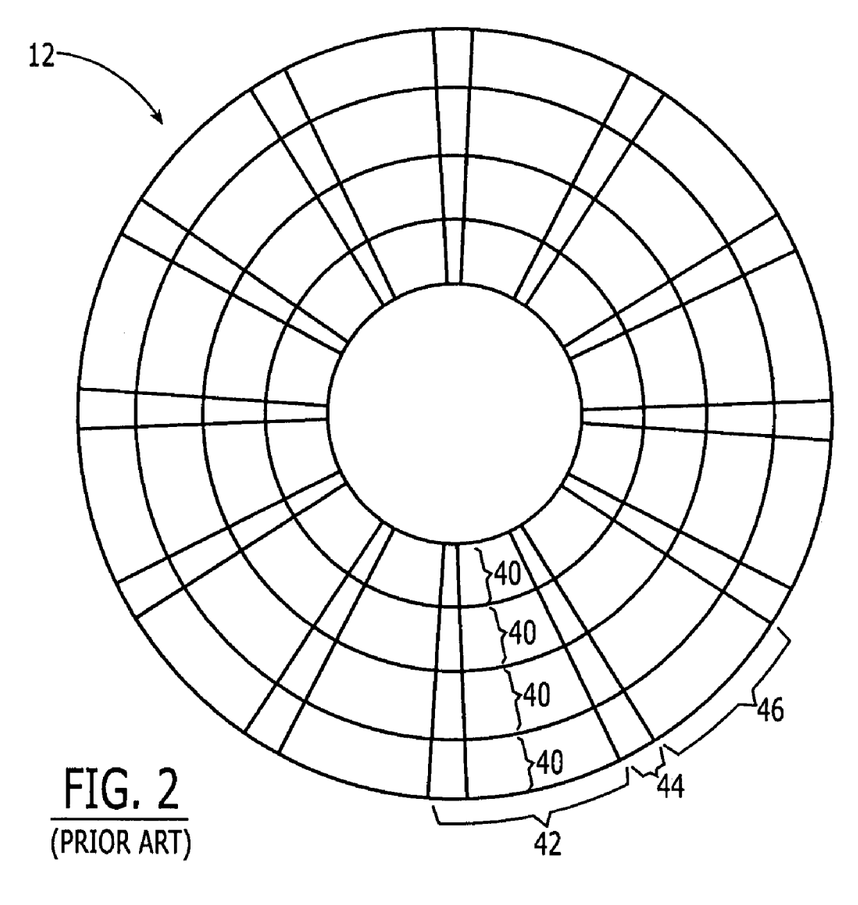
FIG. 2 illustrates a conventional storage disk having tracks and sectors, each of the sectors being divided into a servo region and a data region.

Referring now to FIG. 2, data is stored on the disk 12 within a number of concentric radial tracks 40 (or cylinders). Each track is divided into a plurality of sectors 42. Each sector 42 is further divided into a servo region 44 and a data region 46.

The servo regions 44 of the disk 12 are used to, among other things, accurately position the transducer 20 so that data can be properly written onto and read from the disk 12. The data regions 46 are where non-servo related data (i.e., user data) is stored and retrieved. Such data, upon proper conditions, may be overwritten.

Figure 3:
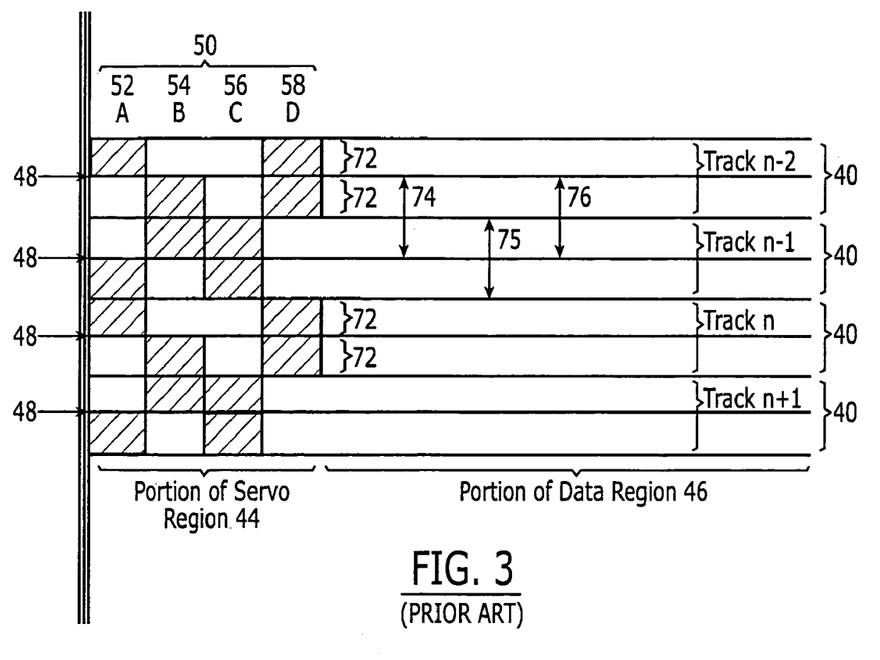
FIG. 3 illustrates portions of conventional tracks on a storage disk, and illustrates a relationship between servo track pitch and data track pitch.

FIG. 3 shows portions of tracks 40 for a disk 12 drawn in a straight, rather than arcuate, fashion for ease of depiction. To accurately write data to and read data from the data region 46 of the disk 12 (see FIG. 2), it is desirable to maintain the transducer 20 in a relatively fixed position with respect to a given track's centerline 48 during each of the writing and reading procedures. Tracks n−2 through n+1, including their corresponding centerlines 48, are shown in FIG. 3.

To assist in controlling the position of the transducer 20 relative to the track centerline 48, the servo region 44 contains, among other things, servo information in the form of servo patterns 50 comprised of one or more groups of servo bursts, as is well-known in the art. First, second, third and fourth servo bursts 52, 54, 56, 58 (commonly referred to as A, B, C and D servo bursts, respectively) are shown in FIG. 3. The servo bursts 52, 54, 56, 58 are accurately positioned relative to the centerline 48 of each track 40. Unlike information in the data region 46, servo bursts 52, 54, 56, 58 may not be overwritten or erased during normal operation of the disk drive 10.

As the transducer 20 is positioned over a track 40 (i.e., during a track following procedure), it reads the servo information contained in the servo regions 44 of the track 40, one servo region 44 at a time. The servo information is used to, among other things, generate a position error signal (PES) as a function of the misalignment between the transducer 12 and a desired position relative to the track centerline 48. As is well-known in the art, the PES signals are input to a servo control loop (not shown) which performs calculations and outputs a servo compensation signal which controls the VCM 28 to, ideally, place the transducer 12 at the desired position relative to the track centerline 48.

A servo track writer (STW) is used to write servo regions 44, including their corresponding fields, onto the surface(s) of the disk 12 during the manufacturing process. The STW controls the transducers 20 corresponding to each disk surface of the disk drive system 10 to write the servo regions 44. In order to precisely write the servo regions 44 at desired locations on the disk 12, the STW directs each transducer 20 to write in small steps, with each step having a width (i.e., STW step width 72 as shown in FIG. 3).

FIG. 3 illustrates the relationship between the STW step width 72 and the pitch 74 of the servo region 44 for a conventional disk drive system. For convenience, the tracks 40 are shown as being straight, rather than arcuate, for ease of depiction.

As used herein, the term "pitch" is the radial distance between centers of adjacent regions on the surface of a disk 12. For example, a servo track pitch 74 (shown in the data region 46 of FIG. 3) is the distance between the centers of radially adjacent servo regions 44. In contrast, the term "width" is defined as the radial distance from one end to the other end of a single region. For example, a servo track width 75 (shown in the data region 46 of FIG. 3) is the width from one end to another of a single servo region 44.

For each servo region 44, the servo track pitch 74 is generally equivalent to the servo track width 75. However, for data regions 46, the data track pitch 76 is generally different from the actual data track width (not shown) due to, for example, the presence of erase bands which are typically found on both sides of each data region 46. For simplicity, the effects that reduce the data track width are not shown in the figures. Instead, the data track width is shown to be the same as the data track pitch.

A STW can include a table that defines a servo track pitch for writing the servo regions on a disk. The table can include, for example, a nominal servo track pitch and a reduced servo track pitch. The STW may test whether it can write and then read information from a predetermined radial location that is near a peripheral portion on the disk. If the written information is successfully read, the STW then writes servo regions on the disk with the nominal servo track pitch.

However, if the written information is not successfully read, then the STW writes the servo regions on the disk with the reduced servo track pitch.

SUMMARY OF THE INVENTION

Some embodiments of the present invention provide methods of making a disk drive that includes a disk on which track pitch for writing tracks is determined based on an available stroke across the disk. The available stroke is identified by searching across the disk for where information can be written and read. The track pitch is determined based on the available stroke across the disk. Tracks are written on the disk based on the determined track pitch.

In some further embodiments of the present invention, searching for the available stroke may include searching for innermost and/or outmost locations on the disk where information can be written on the disk and then read therefrom. The available stroke across the disk may then be determined based on the innermost and/or outermost locations. Searching for the available stroke may alternatively or additionally include identifying a first location on the disk where information can be written on the disk and then read therefrom, identifying a second location on the disk where information cannot be written on the disk and then read therefrom, and determining the available stroke based on at least one of the first and second locations. Searching for the available stroke may alternatively or additionally include writing information at a location on the disk, reading from the location on the disk, determining whether the information was successfully read from the location on the disk, and repeating the writing, reading, and determining at different locations across the disk until the information is determined to be successfully read at a first one of the locations and is determined to be not successfully read at a second one of the locations. The available stroke may then be determined based on at least one of the first and second locations.

In some other further embodiments of the present invention, searching for the available stroke may include determining a location of a transducer ramp, a laser texture zone, and/or a transducer latch, and determining the available stroke based on the determined location.

In some other further embodiments of the present invention, the track pitch for writing tracks may be determined by scaling a reference track pitch based on the available stroke. A reference track pitch may correspond to a reference stroke across the disk, and the track pitch for writing tracks may be determined by scaling the reference track pitch based on a ratio of the available stroke and the reference stroke. The track pitch for writing tracks may alternatively or additionally be determined by selecting among a plurality of reference track pitches based on the available stroke. The determined track pitch may be a servo track pitch, and the servo tracks may be written on the disk based on the determined servo track pitch.

Some other embodiments of the present invention provide an apparatus for writing tracks on a disk. The apparatus includes a transducer, an actuator arm, and a controller. The transducer is configured to write and read information on the disk. The actuator arm is coupled to the transducer and configured to position the transducer relative to the disk along a stroke across the disk. The controller is configured to move the actuator arm relative to the disk to search for an available stroke across the disk where information can be written and read, configured to determine track pitch for writing tracks on the disk based on the available stroke across the disk, and configured to write tracks on the disk through the transducer based on the determined track pitch.

Some other embodiments of the present invention provide a computer program product for writing tracks on a disk in a disk drive. The computer program product includes program code that is configured to search for an available stroke across the disk where information can be written and read, program code that is configured to determine track pitch for writing tracks on the disk based on the available stroke across the disk, and program code that is configured to write tracks on the disk based on the determined track pitch.

The details of one or more embodiments of the invention are set forth in the accompanying drawings and the description below. Other features and advantages of the invention will be apparent from the following description, drawings and claims.

DETAILED DESCRIPTION OF THE INVENTION

The present invention now will be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout. The size and relative sizes of features and regions in the drawings may be exaggerated for clarity.

The present invention may be embodied as systems, methods, and computer program products. Accordingly, the present invention may be embodied in hardware and/or in software (including firmware, resident software, microcode, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. The computer-usable or computer-readable medium may be, for example but not limited to, an electronic, magnetic, optical, electromagnetic, infrared, or semiconductor system, apparatus, device, or propagation medium.

The present invention is described below with reference to block diagrams and/or operational illustrations of systems, methods, and computer program products according to embodiments of the invention. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

As used herein, the singular forms "a", "an" and "the" are intended to include the plural forms as well, unless the context clearly indicates otherwise. The term "and/or" includes any and all combinations of one or more of the associated listed items.

Figure 4:
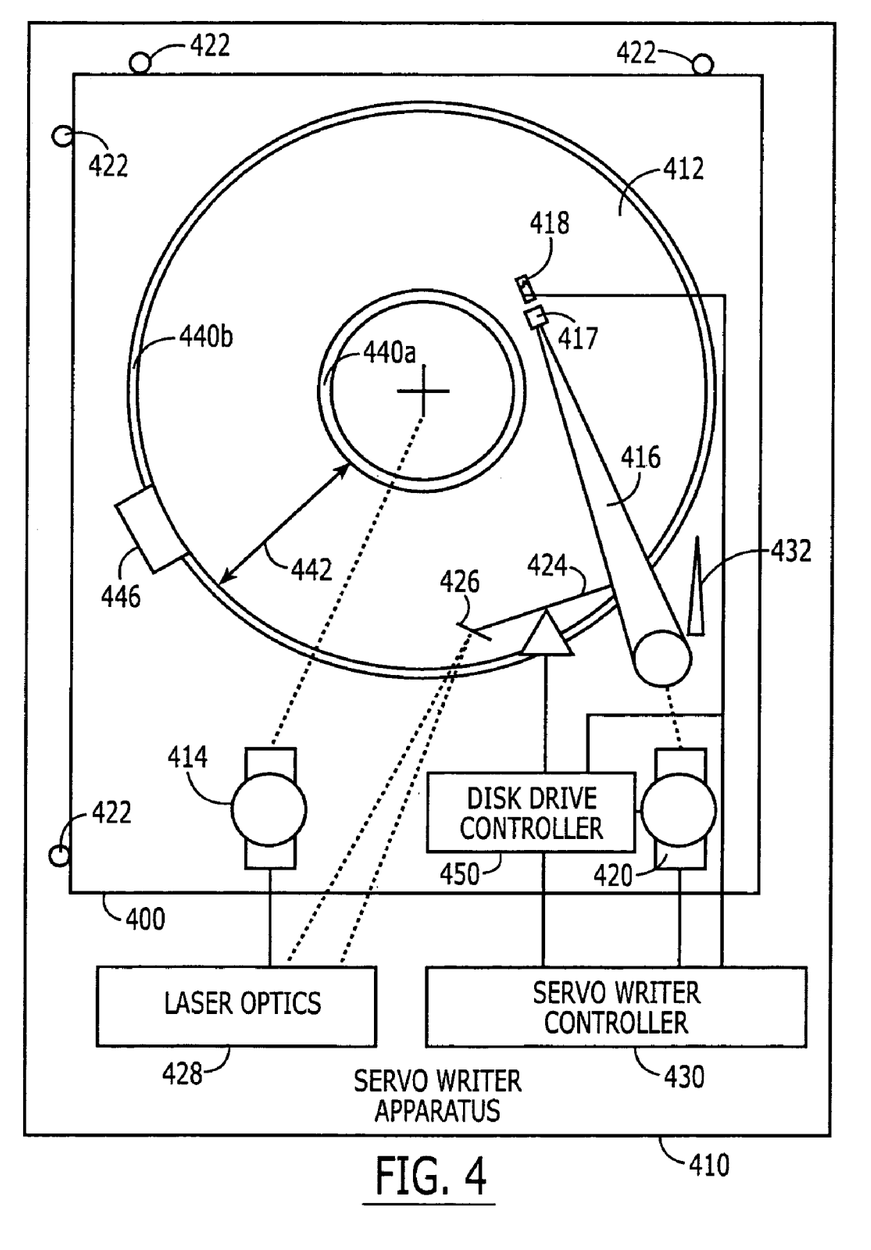
FIG. 4 illustrates a disk drive coupled to a servo writer apparatus according to some embodiments of the present invention.

FIG. 4 shows a disk drive 400 that is mounted within a servo writer apparatus 410 according to some embodiments of the present invention. The disk drive 400 includes at least one storage disk 412, a spin motor 414, an actuator arm 416, and a transducer 418. The storage disk 412, the spin motor 414, the actuator arm 416, and the transducer 418 can be similar to the corresponding elements shown in FIG. 1. The disk 412 may be a magnetic disk, optical disk, or any other type of storage disk having at least one major surface configured to store data in concentric data tracks defined thereon. For purposes of illustration only, various embodiments of the present invention are described below in the context of a magnetic type of disk 412.

The disk 412 is rotated by the spin motor 414. The actuator arm 416 is coupled to the transducer 418, and is rotated by a voice coil motor (VCM) 420 to radially sweep the transducer 418 across the disk 412. A microactuator 417 may be coupled between the actuator arm 416 and transducer 418 and configured to move the transducer 418 more precisely than the VCM 420. The transducer 418 may be a giant magneto-resistive head (GMR), or similar device, that is configured to write information to, and read information from, the storage disk 412. As used herein, "information" can include servo patterns and user data. The transducer 418 can be associated in a "flying" relationship adjacent to the data storage surface of the disk 17, where it is movable relative to, and over, the data storage surface in order to read/write information.

The disk drive 400 is coupled to the servo writer apparatus 410 by alignment pins 422. The servo writer apparatus 410 is configured to move the actuator arm 416 while writing servo information at precise locations on the storage disk 412. The servo writer apparatus 410 includes a push-pin 424, a retro-reflector 426, a laser optics unit 428, and a controller 430. The push-pin 424 has an engagement end that engages the actuator arm 416 and another end coupled to the retro-reflector 426. The retro-reflector 426 reflects a laser beam back to a laser optics unit 428. The laser optics unit 428 may use conventional laser interferometry techniques to determine the precise relative location of the retro-reflector 426 relative to the reference pins 422 and, thereby, the precise relative radial location of the transducer 418 relative to the disk 412. The laser optics unit 428 provides the controller 430 with an indication of the radial location of the transducer 418 relative to the disk 412. The controller 430 moves the push-pin 424 and, thereby, the actuator arm 416 and transducer 418, based on the indication of the radial location of the transducer 418, and writes servo information through the transducer 418 at precisely determined locations on the disk 412. The servo information may be final product servo patterns or, in a self-servo writing process, intermediate servo patterns such as spiral patterns. Based on these intermediate servo patterns, final product servo pattern may be produced in the production process.

According to various embodiments of the present invention, the controller 430 is configured to move the transducer 418 across the disk 412 to search for an available stroke on the disk 412 where information can be written to, and read from, the disk 412. As used herein, "stroke" refers to a radial distance across the disk 412 that can be used to write and read information therefrom. For example, the disk 412 can include two non-storage zones 440a and 440b along an innermost and outermost periphery, respectively, of the disk 412 where information cannot be written and then read through the transducer 418.

For example, one of the non-storage zones 440a–b may correspond to a "park" location that is on or adjacent to the disk 412, and where the transducer 418 can be parked when the disk drive 400 is deenergized. The other one of the non-storage zones 440a–b may correspond to, for example, a periphery edge portion of the disk 412 that is not configured to store information, and/or it may correspond to a crash-stop that prevents radial movement of the transducer 418 over a periphery edge portion of the disk 412.

For purposes of illustration only, a crash-stop 432 is shown that prevents radial movement of the transducer 418 over the non-storage zone 440b along the outer periphery of the disk 412. Accordingly, the available stroke 442 for the disk 412, where the transducer 418 can write and read back information, radially extends between the outer periphery of the non-storage zone 440a and the inner periphery of the non-storage zone 440b.

The non-storage zone 440a and/or 440b may correspond to, for example, a laser texture zone that includes a laser roughened surface that can reduce stiction of the transducer 418 when resting on the disk 412. Alternatively, the non-storage zone 440a and/or 440b may correspond to a ramp/transducer latch 446 and/or the crash stop 432 that is adjacent to the disk 412. The exemplary ramp/transducer latch 446 is located adjacent to an outer periphery of the disk 412 and is configured for the actuator arm 416 to rest thereon when parked so that the transducer 418 is suspended adjacent to the disk 412. The ramp/transducer latch 446 may be located adjacent to the inner periphery of the disk 414, corresponding to the non-storage zone 440a, without departing from the scope of the present invention. Representative ramp/transducer latches are provided in U.S. Pat. No. 6,452,7534 to Hiller et al., entitled "Universal Load/Unload Ramp", and U.S. Pat. No. 6,480,361 to Patterson, entitled "Movable Load Ramps And Crash Stop For A Disk Drive", the disclosures of which are hereby incorporated by reference as if set forth in their entirety.

The available stroke 442 can vary from one disk to another because of, for example, variation in the location of a laser texture zone, a transducer ramp, a transducer latch, and/or a crash-stop relative to the disk. Accordingly, the radial location on a non-storage zone on a disk can vary from one disk to another. The controller 430 is configured to search for the available stroke 442 on the disk 412 by searching for the radial location of at least one of the non-storage zones 440a–b. Searching for a non-storage zone on the disk 412 can correspond to searching for the radial location of a laser texture zone, a transducer ramp, a transducer latch, and/or a crash-stop. The controller 430 is also configured to determine the servo track pitch based on the available stroke, and to use the determined servo track pitch to write radially adjacent servo regions on the disk 412 via the transducer 418. For example, with reference to FIGS. 3 and 4, the controller 430 may write the servo regions 44, including the servo bursts 52, 54, 56, and 58, with the determined servo track pitch 74.

Accordingly, by searching for the available stroke on a disk, and then determining the track pitch based on the available stroke, the track pitch may be determined or optimized for the disk. For example, when the available stroke is greater than a reference stroke (e.g., typical stroke) for a disk, the controller 430 may increase the servo track pitch that it uses to write servo regions on the disk while maintaining the number of servo tracks the same. In particular, the controller 430 may maximize the servo track pitch while maintaining the number of servo tracks/data tracks constant (i.e., maintain the same data storage capacity for a disk). Increasing the servo track pitch may allow the servo regions to be written across more of the available stroke on the disk, and which may thereby increase the data track pitch. Increasing the servo track pitch and/or the data track pitch may increase the manufacturing yield for disk drives. For example, an increased servo track pitch and/or data track pitch may allow an increased variation in the width of a read element and/or a write element width in a transducer to be acceptable, and which may thereby increase their manufacturing yield. Increased servo track pitch and/or data track pitch may enable a transducer to settle onto a track more quickly and may reduce servo-offtrack-error.

Figure 5:
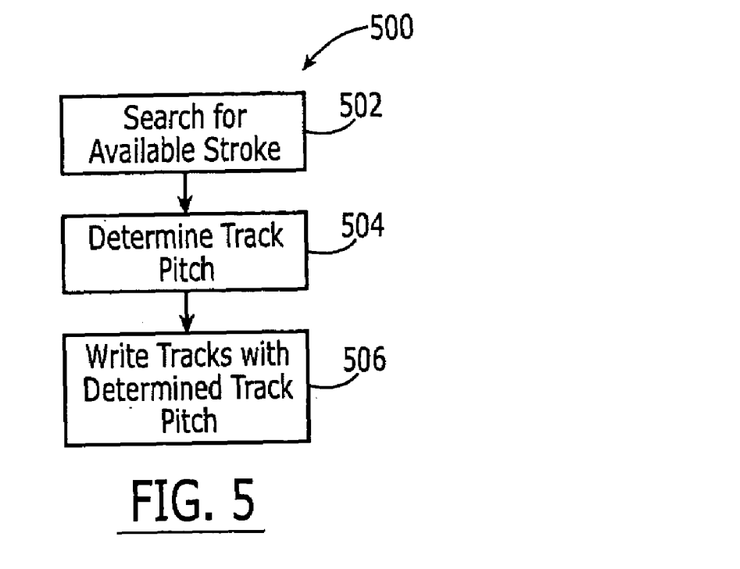
FIG. 5 illustrates a flowchart of a process for writing tracks on a disk based on an available stroke, according to some embodiments of the present invention.

Referring now to FIG. 5, a process 500 is shown for writing tracks on a disk based on an available stroke for the disk. A search (502) is performed across a disk to identify an available stroke where information can be written and read back. A track pitch is determined (504) based on the available stroke for the disk. The track pitch may be determined by scaling a reference track pitch based on the available stroke across the disk. For example, the reference track pitch may correspond to a reference stroke, and the track pitch may be determined by scaling the reference track pitch based on a ratio of the available stroke and the reference stroke. Accordingly, the determined track pitch may be increased relative to the reference track pitch when the available stroke is greater than the reference stroke. The track pitch may alternatively, or additionally, be determined by selecting among a plurality of reference track pitches based on the available stroke. Tracks, which may be servo tracks, are written (506) using the determined track pitch. In a self-servo writing process, intermediate pattern may also be written with the same track pitch by, for example, scaling the velocity of the spiral patterns.

Figure 6:
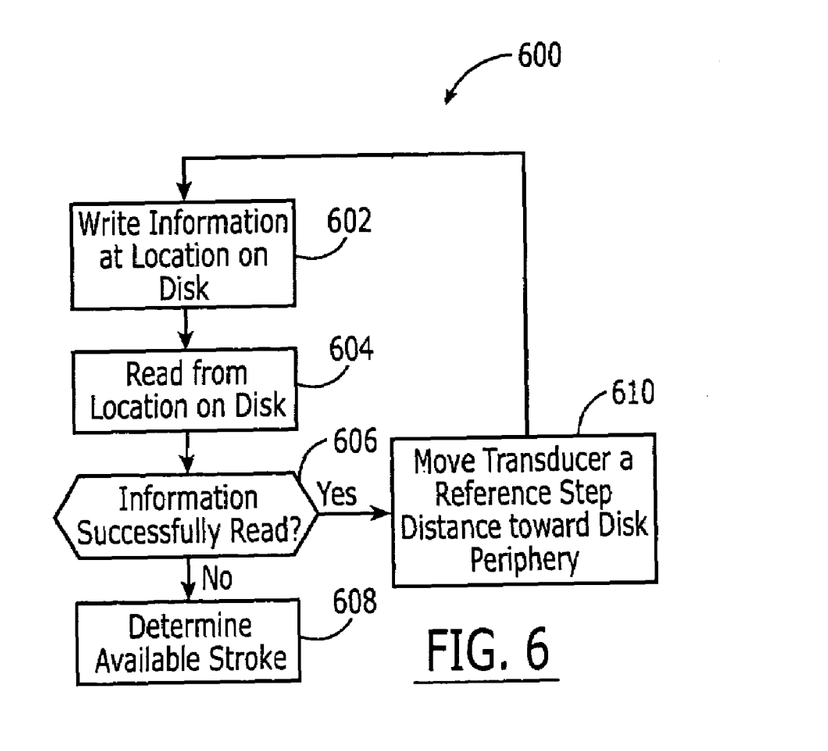
FIG. 6 illustrates a flowchart of a process for searching for an available stroke on a disk, according to some embodiments of the present invention.

Referring to FIG. 6, a process 600 is shown for searching for an available stroke on a disk, and which may be carried out as the searching (502) in process 500 (FIG. 5). Information is written (602) at a location on the disk through a transducer. The location where information is written may be initially selected near a periphery of the disk close to, for example, one of the non-storage zones 440a–b. A read operation (604) is performed at the previously written location in an attempt to read-back the information. A decision is made (606) as to whether the information was successfully read from the location. If the information was successfully read, the transducer is moved (608) a reference radial step distance toward the disk periphery. The reference radial step distance may be based on a reference stroke distance for a disk. For example, the reference radial step distance may be 0.04% of the reference stroke distance. As will be appreciated to one have skill in the art, the speed of the search and/or the accuracy of the determined available stroke may be based on the size of the reference radial step distance.

The process 600 then repeats the writing of information (602), reading (604), and determination (606) while moving the transducer radially across the disk until the information is determined (606) to not have been successfully read back from the disk. Upon the determination (606) that the information was not successfully read back from the disk, the available stroke is determined (610) based on the radial location of the transducer, which can be based on the last radial location where information was successfully written and then read back and/or may be based on the last location where information was not successfully written and then read back.

By sequentially scanning in opposite radial directions on a disk, the process 600 may identify the innermost location and/or the outermost location on the disk where information can be written on the disk and then read therefrom. Accordingly, the process 600 may be used to determine the location of a laser texture zone, a transducer ramp, a transducer latch, crash stop, and/or other apparatus that causes a non-storage zone on the disk.

As will be appreciated to one having skill in the art, information may be written at a plurality of radial locations on the disk. The transducer may then be scanned across the previously written radial locations to determine whether the information can be read back, and if not, to determine the location where the information cannot be successfully read back.

When a non-storage area along an inner/outer periphery of a disk is defined by a crash stop, the radial location of the crash stop may be determined in a conventional manner, such as by monitoring movement of the transducer 418 until resistance to movement is sensed at the crash stop. The radial location of the other non-storage area along an opposite (outer/inner) periphery of the disk from the crash stop may be identified by the searching process 600. The radial location of the crash stop and the radial location of the non-storage area, identified by the searching process 600, may then be combined to determine the available stroke of the disk (i.e., determine the radial distance between the locations).

Figure 7:
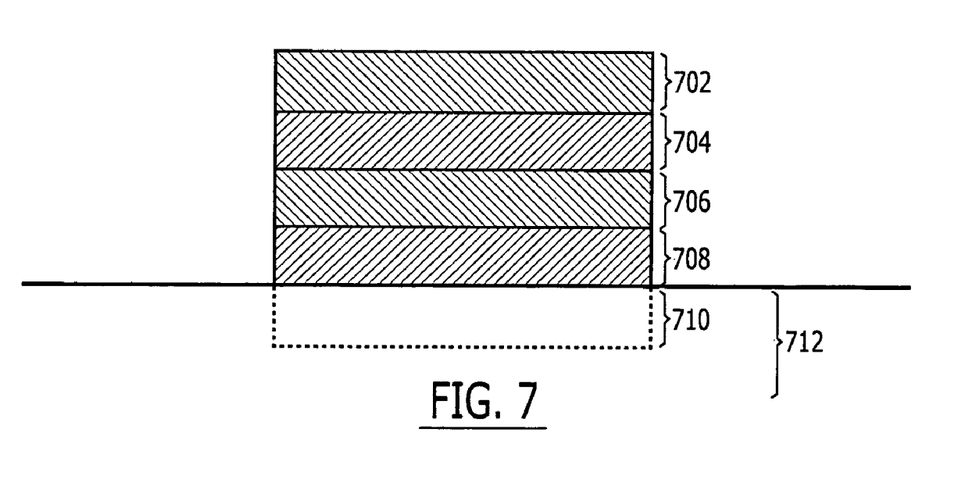
FIG. 7 illustrates portions of information written on a disk while searching for an available stroke, according to some embodiments of the present invention.

FIG. 7 illustrates portions of information that have been written on a disk while searching for an available stroke across the disk, and which may be written by process 600 (FIG. 6). The information is drawn in a straight, rather than arcuate, fashion for ease of depiction. Information 702 is initially written by a transducer at a location close to a periphery of the disk. The information 702 is successfully read back, so the transducer is stepped closer to the periphery of the disk and information 704 is written on the disk. The information 704 is successfully read back, so the transducer is repetitively stepped toward the periphery of the disk, with information 706 being written on the disk and successfully read back, and subsequent information 708 being written and successfully read back.

When the transducer is stepped from the location where information 708 was written, it becomes over a non-storage zone 712 on the disk, where the transducer is not able to write and then read back information (indicated by dashed area 710). Accordingly, the radial location of the non-storage zone 712 can thereby be determined based on the location of the information 708 and/or based on the location where information 710 was not stored on the disk.

As was described above, the available stroke on the disk for writing and reading information can then be determined based on the location of the non-storage zone 712. Although the information 702, 704, 706, 708, and 710 have been illustrated as substantially aligned adjacent locations on the disk, one or more may be distributed along radially adjacent locations on the disk without departing from the scope of the present invention. Moreover, the information 702, 704, 706, 708, and/or 710 may be more radially distributed with intervening areas therebetween, such that they are not immediately adjacent to one another.

Processes 500 and/or 600 may be, for example, executed by the controller 430 (FIG. 4) in the servo writer apparatus 410. Alternatively or additionally, at least part of the processes 500 and/or 600 may be executed by a controller 450 in the disk drive 400, such as part of a self-servo writing operation by the disk drive 400. The disk drive 400 may perform the self-servo writing operation at least partially independent of the servo writer apparatus 410. To perform a self-servo writing operation that includes at least a part of processes 500 and/or 600, the disk drive 400 may include additional components such as those shown in FIG. 1. For example, the disk drive 400 may further include the electronic circuits 30, and circuitry therein to determine the radial location of the transducer 418 relative to the disk 412.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A method of making a disk drive having a disk, the method comprising:
   searching for an available stroke across the disk where information can be written and read;
   determining track pitch for writing tracks on the disk based on the available stroke across the disk; and
   writing tracks on the disk based on the determined track pitch, wherein searching for an available stroke across the disk comprises:
   writing information at a location on the disk;
   reading from the location on the disk;
   determining whether the information was successfully read from the location on the disk;
   repeating the writing information, reading, and determining at different locations across the disk until the information is determined to be successfully read at a first one of the locations and is determined to not be successfully read at a second one of the locations that is adjacent to the first one of the locations; and
   determining the available stroke across the disk based on at least one of the first and second locations.

2. The method of claim 1, wherein searching for an available stroke across the disk comprises:
   searching for an innermost location on the disk where information can be written on the disk and then read therefrom;
   searching for an outermost location on the disk where information can be written on the disk and then read therefrom; and
   determining the available stroke across the disk based on the innermost and outermost locations.

3. The method of claim 1, wherein determining track pitch comprises scaling a reference track pitch based on the available stroke across the disk.

4. The method of claim 1, wherein determining track pitch comprises selecting among a plurality of reference track pitches based on the available stroke across the disk.

5. The method of claim 1, wherein:
   determining track pitch comprises determining servo track pitch based on the available stroke across the disk; and
   writing servo tracks on the disk based on the determined servo track pitch.

6. The method of claim 5, wherein a number of servo tracks written on the disk does not vary based on the determined servo track pitch.

7. A method of making a disk drive having a disk, the method comprising:
   searching for an available stroke across the disk where information can be written and read;
   determining track pitch for writing tracks on the disk based on the available stroke across the disk;
   writing tracks on the disk based on the determined track pitch; and
   providing a reference track pitch that corresponds to a reference stroke across the disk, and wherein determining track pitch comprises scaling the reference track pitch based on a ratio of the available stroke and the reference stroke.

8. The method of claim 7, wherein searching for an available stroke across the disk comprises:
   determining a location of a transducer ramp relative to a radial direction along the disk; and
   determining the available stroke across the disk based on the location of the transducer ramp.

9. The method of claim 7, wherein searching for an available stroke across the disk comprises:
   determining a location of a laser texture zone on the disk; and
   determining the available stroke across the disk based on the location of the laser texture zone.

10. The method of claim 7, wherein searching for an available stroke across the disk comprises:
    determining a location of a transducer latch relative to a radial direction along the disk; and
    determining the available stroke across the disk based on the location of the transducer latch.

11. The method of claim 7, wherein searching for an available stroke across the disk comprises:
    identifying a first location on the disk where information can be written on the disk and then read therefrom;
    identifying a second location on the disk adjacent to the first location where information cannot be written on the disk and then read therefrom; and
    determining the available stroke across the disk based on at least one of the first and second locations.

12. The method of claim 11, wherein determining the available stroke across the disk is further based on a location on the disk where movement of a transducer is limited by a crash stop.

13. The method of claim 7, wherein determining track pitch comprises increasing the track pitch relative to the reference track pitch when the available stroke is greater than the reference stroke.

14. An apparatus for writing tracks on a disk, comprising:
    a transducer that is configured to write and read information on the disk;
    an actuator arm coupled to the transducer and configured to position the transducer relative to the disk along a stroke across the disk; and
    a controller that is configured to move the actuator arm relative to the disk to search for an available stroke across the disk where information can be written and read, configured to determine track pitch for writing tracks on the disk based on the available stroke across the disk, configured to write tracks on the disk through the transducer based on the determined track pitch, configured to write information at a location on the disk, configured to read from the location on the disk through the transducer and to determine whether the information was successfully read from the location on the disk, configured to repeat the writing of the information, the reading at the written information location, and the determining of whether the information was successfully read at different locations across the disk until the information is determined to be successfully read at a first one of the locations and is determined to not be successfully read at a second one of the locations that is adjacent to the first one of the locations, and configured to determine the available stroke across the disk based on at least one of the first and second of the locations.

15. The apparatus of claim 14, wherein the controller is configured to determine an innermost location and an outermost location on the disk where information can be written by the transducer on the disk and then read therefrom, and configured to determine the available stroke across the disk based on the innermost and outermost locations.

16. The apparatus of claim 14, wherein the controller is configured to scale a reference track pitch based on the available stroke across the disk.

17. The apparatus of claim 14, wherein the controller is configured to select among a plurality of reference track pitches based on the available stroke across the disk.

18. The apparatus of claim 14, wherein the controller is configured to determine servo track pitch based on the available stroke across the disk, and is configured to write servo tracks on the disk through the transducer.

19. The apparatus of claim 18, wherein a number of servo tracks written by the controller on the disk does not vary based on the determined servo track pitch.

20. The apparatus of claim 18, wherein at least a portion of the controller is within a servo track writer.

21. An apparatus for writing tracks on a disk, comprising:
a transducer that is configured to write and read information on the disk;
an actuator arm coupled to the transducer and configured to position the transducer relative to the disk along a stroke across the disk; and
a controller that is configured to move the actuator arm relative to the disk to search for an available stroke across the disk where information can be written and read, configured to determine track pitch for writing tracks on the disk based on the available stroke across the disk, configured to write tracks on the disk through the transducer based on the determined track pitch, and configured to determine the track pitch for writing tracks on the disk by scaling a reference track pitch, which corresponds to a reference stroke, based on a ratio of the available stroke and the reference stroke.

22. The apparatus of claim 21, wherein the controller is configured to identify a first location on the disk where information can be written by the transducer on the disk and then read therefrom, configured to identify a second location on the disk adjacent to the first location where information cannot be written by the transducer on the disk and then read therefrom, and configured to determine the available stroke across the disk based on at least one of the first and second locations.

23. The apparatus of claim 22, further comprising a crash stop that limits radial movement of the transducer, and wherein the controller is configured to further determine track pitch based on a location on the disk where movement of the transducer is limited by the crash stop.

24. The apparatus of claim 21, wherein the apparatus further comprises a transducer ramp, and the controller is configured to determine a location of the transducer ramp relative to a radial direction along the disk, and configured to determine the available stroke across the disk based on the location of the transducer ramp.

25. The apparatus of claim 21, wherein the disk defines a laser texture zone, and the controller is configured to determine a location of the laser texture zone, and is configured to determine the available stroke across the disk based on the location of the laser texture zone.

26. The apparatus of claim 21, wherein the apparatus further comprises a transducer latch, and the controller is configured to determine a location of the transducer latch relative to a radial direction along the disk, and configured to determine the available stroke across the disk based on the location of the transducer latch.

27. The apparatus of claim 21, wherein the controller is configured to increase the track pitch relative to the reference track pitch when the available stroke is greater than the reference stroke.

28. A computer program product for writing tracks on a disk in a disk drive, the computer program product comprising program code tangibly embodied in a computer-readable storage medium, the computer code comprising
program code that is configured to search for an available stroke across the disk where information can be written and read;
program code that is configured to determine track pitch for writing tracks on the disk based on the available stroke across the disk; and
program code that is configured to write tracks on the disk based on the determined track pitch, wherein the program code that is configured to search for an available stroke across the disk is further configured to write information at a location on the disk, read from the location on the disk, determine whether the information was successfully read from the location on the disk, repeat the writing information, reading, and determining at different locations across the disk until the information is determined to be successfully read at a first one of the locations and is determined to not be successfully read at a second one of the locations that is adjacent to the first one of the locations, and to determine the available stroke across the disk based on at least one of the first and second locations.

29. The computer program product according to claim 28, further comprising:
program code that is configured to write servo tracks on the disk based on the determined track pitch.

30. The computer program product according to claim 28, further comprising:
program code that is configured to determine track pitch for writing tracks on the disk by scaling a reference track pitch based on the available stroke across the disk.

* * * * *